United States Patent Office 2,731,742
Patented Jan. 24, 1956

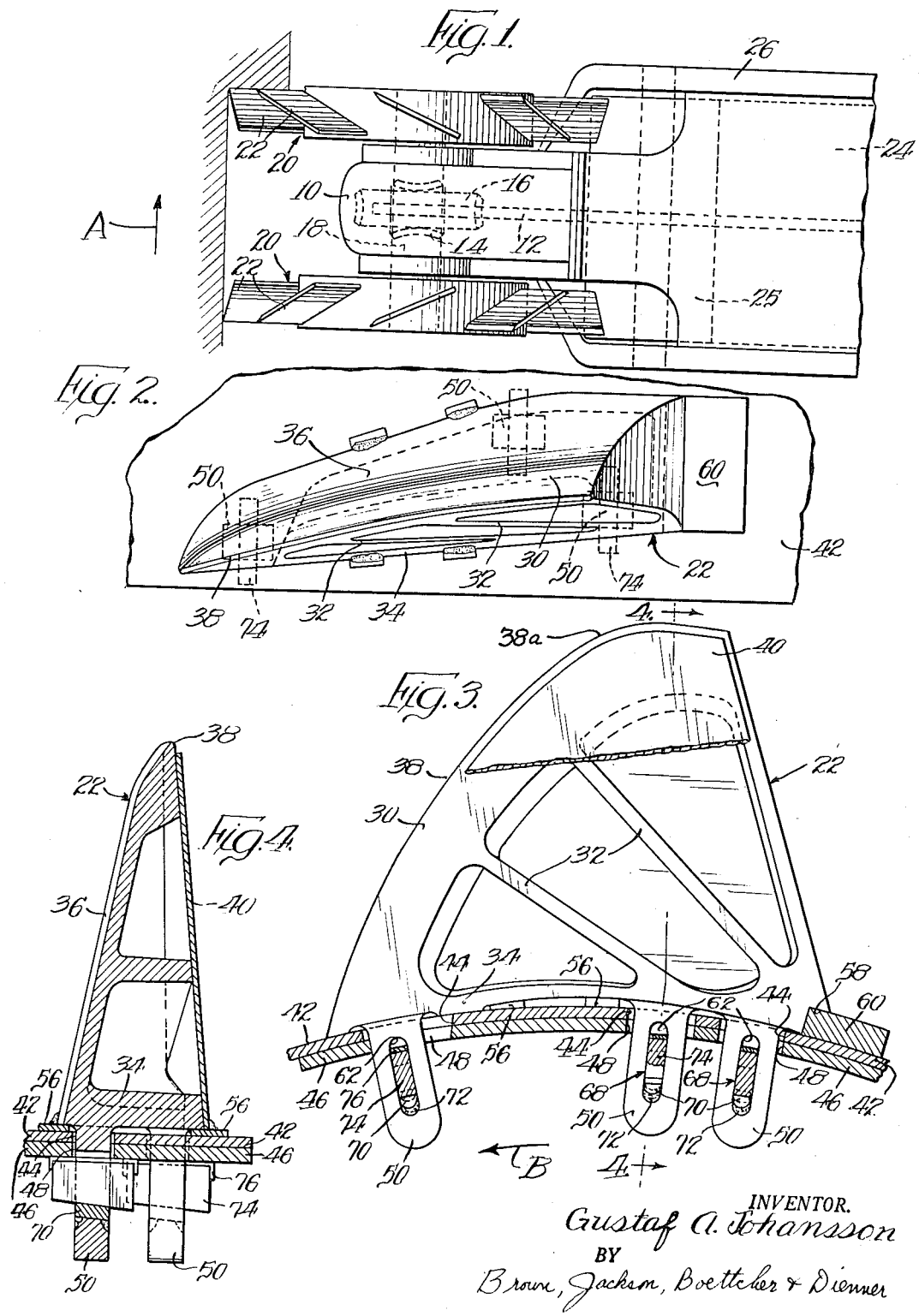

2,731,742

BLADE FOR EXCAVATING MECHANISM

Gustaf A. Johansson, Chicago, Ill., assignor to The United Electric Coal Companies, Chicago, Ill., a corporation of Delaware Application February 2, 1953, Serial No. 334,647

11 Claims. (Cl. 37—189)

The present invention relates to excavating apparatus and to cutting blades for digging wheels of excavating apparatus. In particular, the invention relates to a cutting blade for excavating apparatus of the type disclosed in the copending application of Frank F. Kolbe, Serial No. 281,950, filed April 12, 1952.

In the identified copending application, there is disclosed an excavating apparatus comprising a pair of spaced rotary digging wheels adapted to be moved against a bank of earth material for cutting material from the bank, the cut material being retained by the wheels and directed thereby to a discharge conveyor. In use of the apparatus, the digging wheels, comprising wheel hubs with blades mounted thereon, are moved laterally of the bank of material so that the blades cut sideways into the bank. To guide the cut material into the space between the wheels and to force the material between the wheels onto the conveyor, the blades must present inclined surfaces adapted to perform the stated functions. In the copending application, the cutting blades are shown in one form as comprising flat, sheet-like blades mounted on the wheel hubs and inclined with respect to the path of rotation of the wheel to cut the material equally well when swinging arcuately in either direction.

The primary object of the present invention is to provide an improved cutting blade for digging wheels of excavating apparatus of the character described.

Another object of the invention is to provide a cutting blade for digging wheels of the character shown in the identified copending application adapted to be positioned on a hub to present an efficient and effective cutting edge and an inclined surface leading from the cutting edge to the inside of the wheel adapted to perform the material guiding and impelling functions stated hereinbefore.

A further object of the invention is to provide a digging wheel blade having a cutting edge inclined from the bottom to the top thereof in the direction of rotation of the wheel so that the blade performs a progressive cut on materials engaged thereby.

Another object is to provide a digging wheel blade having a cutting edge curved rearwardly and upwardly from the bottom to the top in the direction of rotation of the wheel with the curvature being such that the resisting force of the bank being cut preferably will have its normal component forward of a rear heel, or shear lug so as to reduce the bending moment of the normal force acting on the blade when cutting.

A still further object is to provide a digging wheel cutting blade including simple means for removably securing the blade to a digging wheel hub.

Additional objects include the provision of an economical long wearing cutting blade adapted for strenuous service and further adapted to quick and convenient replacement should same become damaged due to encountering boulders, rock layers and the like.

Other objects and advantages of the present invention will become apparent in the following detailed description of a preferred embodiment of the invention, wherein reference is made to the accompanying drawings, in which:

Figure 1 is a plan view of one form of excavating apparatus with which the blade of the present invention is adapted for use;

Figure 2 is a plan view of the cutting blade of the present invention mounted on the hub of a digging wheel, the hub being shown fragmentarily;

Figure 3 is a side elevation of the cutting blade mounted on the wheel hub, the hub and mounting means for the cutting blade being shown in cross section; and Figure 4 is a cross sectional view taken substantially on line 4—4 of Figure 3.

Referring now to the drawings, and particularly to Figure 1, the excavating apparatus with which the cutting blade of the present invention is adapted for use is shown as comprising a gear housing 10 adapted to enclose a drive shaft 12 and a worm gear 14 secured to the drive shaft 12 and meshing with a pinion 16 secured to a wheel shaft or axle 18. Digging wheels 20 are secured to the outer ends of the shaft or axle 18 and are provided, on their peripheral surfaces, with a plurality of blades 22, the blades being shown somewhat schematically in Figure 1. A conveyor belt 24 extends rearwardly from the digging wheels 20 and is adapted to lead to a point of material discharge, the conveyor belt being driven in a conventional manner and being mounted for rotation on a terminal roller 25, having its axle suitably journaled in the frame 26 of the excavating apparatus. A guide plate, not shown, extends from a position between the digging wheels 20, beneath the housing 10, into overlying relationship with respect to the conveyor belt 24 to guide earth materials from the space between the digging wheels 20 onto the upper run of the conveyor belt 24.

In operation, the excavating apparatus is adapted to be swung horizontally, as indicated by arrow A, to move the cutting blades 22 of one digging wheel 20 into engagement with a bank of material to remove a layer of material from the bank, as is shown in Figure 1. As the blades 22 are moved into engagement with the bank of material, the cutting edges thereof bite into the bank and remove material therefrom, the material being guided upon continued rotation of the digging wheels 20 into the space between the digging wheels by the forwardly disposed inclined surfaces of the cutting blades. The inclined surfaces of the cutting blades 22 effecting the cut move the material into the space between the wheels and the inclined surfaces of the cutting blades 22 of the other digging wheel 20 prevent discharge of earth materials from the space between the wheels laterally thereof. The bank of material closes the forward end of the space between the wheels so that the inclined surfaces of the blades, engaging the material between the wheels, force the material in the direction of rotation of the wheels to move same onto and over the surface of the guide plate, the guide plate serving to direct the material from the space between the wheels onto the conveyor belt 24 which carries the material to a point of disposal.

From the foregoing, it will be appreciated that the cutting blades for excavating apparatus of the general type described must present a cutting surface or edge to cut into the bank of material and must present inwardly directed and forwardly disposed inclined surfaces to guide and propel the material into the space between the wheels and to retain the material in that space until the cut material passes from the cut bank and traverses the guide plate whence it is discharged in a generally tangential direction and lands on the top of the conveyor belt 24. The present invention is directed to the provision of a cutting blade having these predominant characteristics.

Referring now to Figures 2 to 4, the cutting blade 22 of the present invention is shown as comprising a cast metal body 30, which may be cored, if desired, to provide a hollow portion 31 intersected by a plurality of re-enforcing ribs 32. The body 30 is provided with a wide base portion 34 and the blade tapers upwardly and forwardly with respect to the base portion 34 to provide an inclined inner surface 36. The blade is adapted to be mounted on a wheel hub adjacent the edge thereof, so that the inclined surface 36 extends diagonally of the hub and leads from adjacent the outer edge of the wheel inwardly toward the inside of the wheel. As previously stated, the body 30 tapers upwardly and forwardly to provide a terminal inclined edge 38 constituting the cutting edge of the blade. The cutting edge 38 is preferably curved in form, as shown in Figure 3, so as to provide the most effective cutting edge possible. As shown in Figure 3, the cutting edge 38 is preferably inclined rearwardly and upwardly from the forward edge (the left-hand edge in Fig. 3) toward the trailing edge in the direction of rotation of the digging wheel so as to present a cutting edge adapted to effect a progressive cut on the bank of material to be engaged by the blade. It will be observed that the curvature of cutting edge 38 is generally arcuate and changes its curvature, as at 38a, to an arc of shorter radius.

The curvature of the cutting edge 38 is such that the resistant force of the excavated material against it has its normal component acting in a line intersecting the base of the blade between its front and rear, and preferably intersecting the base ahead of the heel or shear lug 60 which lug will be described hereinafter.

It will be observed that the base portion 34 of the blade 22 generally is wide relative to the cutting edge 38. The base portion also widens from its forward portion, where the cutting edge 38 comes down to meet it, towards its rear portion, where it abuts the heel, or shear lug 60. Consequently, the blade is enabled better to resist being bent sideways by such component of force as is exerted sideways against the inclined surface 36 as the bank is cut into. It will be observed that as the curved cutting edge rotates more deeply into the bank, and therefore meets increasing resistance, the resultant component of lateral force against the inclined surface 36 moves rearwardly where the base 34 becomes wider and can, therefore, better resist lateral bending.

To prevent accumulation of materials within the cored portion of the cutting blade and to prevent occurrence of resistance to cutting due to accumulation of material within the cored section of the blade, the cored side of the blade may be suitably covered by a plate 40 which may be secured in any desired manner, preferably by welding, to the surfaces of the cored side of the blade. The cored out portion of the blade is very important as the means of reducing dead weight which by its inertia when rotating will add too much of a shock load to the wheel when boulders and rocks are encountered.

In use, the cutting blade performs the functions described hereinbefore with respect to the operation of the excavating apparatus shown in Figure 1. In other words, as the digging wheels are rotated in the direction indicated by the arrow B in Figure 3, the cutting edge 38 will cut into the bank of material with which engaged to remove or cut away a portion of the material. As the cutting edge 38 bites into the material, the material will engage the inclined inner surface 36 of the blade and will be directed thereby to the inside of the wheel and into the space between the two digging wheels 20. In addition, the inclined surface 36 of the cutting blades will force the material within the space between the wheels in the direction of travel of the wheels and onto and over the guide plate to the conveyor, as described, hereinbefore.

Due to the fact that the cutting blades must frequently engage rocks, boulders, and other materials having substantial resistance to cutting, it is preferable that the blades be removably mounted on the surface of the digging wheel hub so that individual blades may be readily removed and replaced should damage occur thereto. Accordingly, while the blade, as described hereinbefore, may be suitably secured to the digging wheel hub merely as by welding or the like, it is preferable that the blades be removably or detachably mounted on the hub in the following manner.

The hub 42 of digging wheel 20 is shown as being cylindrical because of the economy and strength of cylindrical objects. However, the digging wheel hub 42 may be of polygonal form, as is shown in the copending application of Frank F. Kolbe, or may be otherwise suitably shaped as desired. The number of blades to be mounted on the hub may be selected at the discretion of the designer, and at each blade location, the hub 42 is provided with three spaced and laterally offset slots or apertures 44. A re-enforcing plate 46 is suitably secured, as by welding, to the inner surface of the hub 42 at each slotted portion thereof to increase the rigidity and strain resistance of the hub at that location, the re-enforcing plate 46 being provided with apertures 48 aligned with the apertures 44 in the hub 42. The cutting blade 22 is preferably provided with a plurality of lugs 50, the number of lugs corresponding to the number of apertures or slots in the hub 42 and re-enforcing plate 46. The lugs 50 are formed integrally with the base portion 34 and extend in a direction opposite from the body 30 of the blade 22. They are spaced from one another and laterally offset from one another, as indicated in Figure 2. The lower surface of the base 34 of the blade 22 is shaped to correspond to the surface configuration of the wheel hub, the lower surface of the base being arcuate in form in the preferred embodiment of the invention. The individual cutting blades 22 are adapted to be associated with the wheel or hub 42 by inserting the lugs 50 through the apertures 44 and 48, and the body 30 of the cutting blade may be properly fitted to and aligned with the surface of the hub by means of shims 56 which may be suitably welded to the base portion 34 of the blade. The lower edge of the base portion 34 of the cutting blade is provided at the trailing edge thereof with a notch 58 adapted for the reception of a heel or shear lug 60 suitably secured to the surface of the hub 42, as by welding or the like. The cutting blade is positioned upon the digging wheel hub in such manner that the edges of the blade defining the notch 58 engage the surfaces of the shear lug 60 in firm abutting relation.

Each of the cutting blade lugs 50 is provided with a slot 62 adapted for the reception of a wedge member, indicated generally at 68. The slots 62 in the lugs 50 are each provided with a terminal portion at the top thereof extending parallel to the lower surface of the base 34 of the cutting blade and disposed outwardly of the inner, or under, surface of the wheel hub, and each have a lower terminal edge inclined with respect to the upper terminal edge and disposed a substantial distance radially inwardly of the inner surface of the hub. As will be noted from Figure 3, the slots 62 are formed in the lugs 50 during casting of the cutting blade and, accordingly, the terminal portions of the slots are rounded and are not finished. To provide a wedging surface, a wedge or wear plate 70 is positioned in each slot 62, at the bottom thereof, and is secured in the slot preferably by welding, as indicated at 72. The wedge or wear plate 70 presents an upper surface inclined with respect to the lower surface of the base 34 of the cutting blade, and is adapted for the reception of a wedge member 74. An adjustable shim 76 is suitably secured, as by welding, to the upper surface of the wedge member 74. As shown in Figure 4, the wedge 74 has a flat upper surface and an inclined lower surface adapted to cooperate with the inclined surface presented by the wedge or wear plate 70. The wedge plate 70 is preferably associated with the lugs 50 prior to mounting of the cutting blade on the wheel hub. Likewise, the shims 56 and the shims 76 are suitably chosen prior to mounting of the cutting blade on the wheel hub so that the assembly may be readily and conveniently accomplished.

Accordingly, the individual cutting blades are separately and removably associated with the digging wheel hub and are readily and conveniently mounted on the hub by inserting the lugs of the cutting blade through the apertures in the wheel hub and the re-enforcing plate, and forcing the blade into engagement with the shear lug 60, after which the cutting blades may be secured to the digging wheel hub by jamming each of the wedge members 74 into wedging engagement with the respective lower surface of the re-enforcing plate 46 and the upper surface of the wedge or wear plate 70. The wedge plate 70 and the wedge 74 preferably provide cooperating inclined surfaces, having a slight degree of inclination so that the wedge will be automatically locked in position and will not of itself tend to loosen. The lugs 50 are spaced from one another and are laterally offset, as pointed out hereinbefore, so that the wedge members 74 may be individually and conveniently driven into locking relationship with the lugs and the wheel hub.

Due to the configuration of the cutting edge 38 of the blades of the present invention, the blades will automatically tend to retract from any obstruction met thereby, such as boulders and rock layers, but, if retraction of the blades is not possible, it is desirable in certain instances to provide means accommodating the automatic disassociation of the blade and wheel hub upon encountering in irresistible object so that the wheel hub and the driving mechanism for the digging wheels will not be damaged.

According to the present invention, the shear lug 60 is provided to prevent rearward movement of the cutting blade with respect to the digging wheel hub, regardless of the objects encountered by the cutting blade. Further, according to the invention, the wedge members 74 may conveniently constitute shear members which are adapted to shear off, upon occurrence of the blade encountering objects of substantial resistance, so that the cutting blade may pivot about the forward edge of the shear lug 60, and if necessary, become disassociated from the digging wheel hub to avoid damage to the digging wheel hub or to the driving mechanism for the digging wheels. The design of shearable wedge members 74 may be made according to standard engineering principles. However, other instances may occur wherein it is not desirable to provide means accommodating shearing off of the cutting blades. In those instances, the cutting blade, the shear lug, the wedge members, the wheel hub and the re-enforcing plate are designed of such dimensions and materials as to resist any load that may be encountered, any force in excess of a predetermined value resulting in stoppage of the digging wheel driving mechanism. Either design may be readily carried out in accordance with the present invention.

As pointed out hereinbefore, it is desirable to have the cutting blade of the present invention prepared completely for quick and convenient assembly on a digging wheel hub. The reason for this will be readily apparent when the cutting blades are considered as replacements units for other blades and can be utilized to replace cutting blades only when the excavating mechanism is stopped. To render the cutting blades of the present invention immediately usable as replacement blades, adapted to be quickly secured to a wheel hub to prevent prolonged shut-down of the excavating apparatus, the present invention contemplates the formation and the adjustment of the various elements of the cutting blade prior to use thereof, the particular adjustments being accomplished by utilization of a master jig.

The master jig may consist of a section corresponding to a section of a digging wheel hub upon which the blades are to be mounted, such as is shown in Figure 3. The blade is placed in the jig and the lower edge of each of the slots 62 in the lugs 50 is ground smooth and the wedge block 70 is inserted therein. Thereafter, the wedge member 74 is inserted in the slot on top of the wear plate 70 until the wedge member is approximately centered with regard to the lug. The spacing between the top surface of the wedge member 74 and the lower surface of the jig is then measured to determine the necessary thickness of the shim 76. A shim of the necessary thickness is selected and the wedge member 74 is removed from the lug and the shim 76 is placed on top thereof and suitably secured thereto, with the ends of the shim turned over and extending along the sides or end surfaces of the wedge member 74. When the foregoing adjustments have been made for all three lugs, the three wedge blocks or members are driven into tight position to hold the wear plate 70 in position. The wear plate is then welded into the lug, as is indicated at 72. Thereafter, the alignment and positioning of the blade on the jig is checked and suitable shims 56 are secured to the lower surface of the blade to insure proper alignment thereof. The blade is then completely adjusted and usable as a replacement unit with the three lugs being provided with separate markings, the individual wedge members for the respective lugs being provided with corresponding markings, and with the blade and the three wedge members therefor preferably being stored together.

From the foregoing, it will be appreciated that the present invention provides a cutting blade adapted to perform an efficient cutting action on earth materials and to direct those materials, after cutting, as required according to the type of excavating apparatus with which the blade is utilized, the blade being sturdy and economical of manufacture and being particularly adapted for ready and convenient assembly with an excavating wheel hub.

While I have described what I regard to be a preferred embodiment of my invention, it will be apparent that various changes, rearrangements and modifications may be made therein without departing from the spirit and scope of the invention, as defined by the appended claims.

I claim:

1. A cutting blade for excavating apparatus comprising a body portion having a base and tapering upwardly and forwardly with respect to said base, lugs extending from said base in a direction opposite to said body portion, said lugs each having a slot therein, and wedge members adapted to be inserted in said slots to secure the cutting blade to excavating apparatus, said wedge members comprising a wedge block and shim means adapted to be secured to said wedge block to vary the thickness thereof.

2. A cutting blade for excavating apparatus comprising a base, a body portion tapering upwardly and forwardly with respect to said base, shims adapted to be secured to said base, lugs extending from said base in a direction opposite to said body portion, each of said lugs having a slot therein, a wedge member for each lug adapted to be received in the slot in said lug, and a wear plate secured in the slot in said lug and presenting a wedge surface with which said wedge member is adapted to cooperate, said wedge members each comprising a wedge block and shim means adapted to be secured to one surface of said wedge block to vary the thickness thereof.

3. A cutting blade for excavating apparatus comprising a base, a body portion tapering upwardly and forwardly with respect to said base to present a cutting edge at the periphery of said body portion, said body portion having a curved peripheral portion along which said cutting edges lies, the curvature of said peripheral portion being such that a force exerted normal to said cutting edge intersects said base, said body portion including an inclined side wall surface extending rearwardly and laterally away from said cutting edge, said body portion being cored from the side thereof opposite said inclined surface to provide a hollow portion to the blade, and a plate fixed to said body over the cored portion thereof.

4. A digging wheel for excavating apparatus comprising a wheel hub, a plurality of cutting blades detachably mounted on said hub in circumferentially spaced relation, said blades extending generally radially from said hub, said blades each comprising a base portion, a body portion tapering upwardly and forwardly from said base portion, said body portion having a peripheral cutting edge curving upwardly and rearwardly with respect to the forward edge of said base portion in the direction of rotation of said hub, the curvature of said cutting edge being such that a force exerted normal to any point on said cutting edge intersects said base portion, and a plurality of lugs extending from said base portion in a direction opposite said body portion, said lugs including at least one lug adjacent the leading edge of the blade and a plurality of lugs adjacent the trailing edge thereof, said wheel hub having apertures therein adapted for the reception of each lug on each cutting blade, each of said lugs having a slot therein transversely of the respective blade, and a wedge member inserted in the slot in each lug transversely of the respective blade in wedging engagement with the respective lug and with the inner surface of said hub to detachably secure said blades to said hub.

5. A digging wheel for excavating apparatus comprising a hollow wheel hub, a plurality of cutting blades detachably mounted on the outer surface of said hub, said blades each comprising a base portion, a body portion tapering upwardly and forwardly from said base portion to present a cutting edge at the perimeter of said body portion and a surface extending diagonally of said hub, and a plurality of lugs extending from said base portion in a direction opposite said body portion, said wheel hub having apertures therein adapted for the reception of each lug on each cutting blade, each of said lugs being adapted to project through the outer surface of said hub and having a slot therein extending from a point inwardly of the inner surface of said hub to a point outwardly of the inner surface of said hub, a wedge plate positioned in the slot in each lug at the radially inward end thereof, and wedge members adapted to be inserted in the slot in each lug in wedging action with the respective wedge plate and with the inner surface of said hub to detachably secure said blades to said hub.

6. A digging wheel for excavating apparatus comprising a wheel hub, a plurality of cutting blades detachably mounted on said hub, each blade having a cutting edge curving upwardly and rearwardly in the direction of rotation of the wheel, a heel member secured to the hub and abutting the rear of each blade, a plurality of lugs on each blade, said wheel hub having apertures adapted for the reception of each lug, each of said lugs having a slot therein, and wedge members adapted to be inserted in the slot in each lug in wedging action with the respective lug and with the inner surface of said hub to detachably secure said blades to said hub, said wedges of each blade being less strong in shear than said heel member whereby when a predetermined excessive resistance is met said wedges will shear and said blade will pivot about the heel member.

7. A cutting blade for excavating apparatus comprising a body portion having a base adapted to be connected with a rotating digging wheel, said body portion having a cutting edge curving upwardly and rearwardly with respect to the forward edge of said base in the direction of rotation of the wheel to afford a progressive cut, said base having a notch in the trailing edge thereof, and a shear lug adapted to be connected with the digging wheel fitted into said notch in said base, the curvature of said cutting edge being such that a force exerted normal to any point on said cutting edge intersects said base forwardly of said shear lug.

8. A cutting blade for excavating apparatus comprising a base portion of increasing width from the leading end to the trailing end thereof, a body portion extending generally upward from said base portion and tapering upwardly and forwardly to define a cutting edge at the periphery thereof, said cutting edge being curved upwardly and rearwardly from the leading end of said base portion, the curvature of said cutting edge being such that a force exerted normal to any point on said cutting edge intersects said base portion, the projection of said cutting edge on said base portion being of a length less than that of said base portion, said cutting edge commencing at the leading end of said base portion and terminating in upwardly and forwardly spaced relation to the trailing end of said base portion, said body portion presenting a trailing edge inclined from the trailing end of said cutting edge downwardly and rearwardly to the trailing end of said base portion, said base portion having a rearwardly open notch therein at the juncture of the trailing edge of said body portion and the trailing end of said base portion, and a shear block adapted to be secured to the excavating apparatus positioned in said notch.

9. A cutting blade for excavating apparatus comprising a base portion of increasing width from the leading end to the trailing end thereof, a body portion extending generally upward from said base portion and tapering upwardly and forwardly to define a cutting edge at the periphery thereof, said cutting edge being curved upwardly and rearwardly from the leading end of said base portion, the curvature of said cutting edge being such that a force exerted normal to any point on said cutting edge intersects said base portion, the projection of said cutting edge on said base portion being of a length less than that of said base portion, said cutting edge commencing at the leading end of said base portion and terminating in upwardly and forwardly spaced relation to the trailing end of said base portion, said body portion presenting a trailing edge inclined from the trailing end of said cutting edge downwardly and rearwardly to the trailing end of said base portion, at least one attaching lug extending downwardly from said base portion adjacent the leading end thereof, and a plurality of attaching lugs extending downwardly from said base portion at the wider portions thereof adjacent the trailing end thereof.

10. A cutting blade for excavating apparatus comprising a base portion of increasing width from the leading end to the trailing end thereof, a body portion extending generally upward from said base portion and tapering upwardly and forwardly to define a cutting edge at the periphery thereof, said cutting edge being curved upwardly and rearwardly from the leading end of said base portion, the projection of said cutting edge on said base portion being of a length longer than that of said base portion, said cutting edge commencing at the leading end of said base portion and terminating in upwardly and forwardly spaced relation to the trailing end of said base portion, said body portion presenting a trailing edge inclined from the trailing end of said cutting edge downwardly and rearwardly to the trailing end of said base portion, said base portion having a rearwardly open notch therein at the juncture of the trailing edge of said body portion and the trailing end of said base portion, a shear block adapted to be secured to the excavating apparatus positioned in said notch, the curvature of said cutting edge being such that a force exerted normal to any point on said cutting edge intersects said base portion forwardly of said shear block, at least one attaching lug extending downwardly from said base portion adjacent the leading end thereof, a plurality of attaching lugs extending downwardly from said base portion at the wider portions thereof adjacent the trailing end thereof, said attaching lugs each having a slot therein transversely of said blade, and a wedge member insertable in the slot in each of said lugs, said wedge members being less strong in shear than said shear block.

11. A digging wheel for excavating apparatus comprising a hollow wheel hub, a plurality of cutting blades detachably secured to said hub in circumferentially spaced relation, said blades extending generally radially outwardly of said hub, each of said blades comprising a base portion engaging the surface of said hub of increasing width from the leading end to the trailing end thereof, a body portion extending generally radially outwardly from said base portion and tapering outwardly and forwardly to define a cutting edge at the periphery thereof, said cutting edge being curved radially outwardly and rearwardly from the leading end of said base portion, the curvature of said cutting edge being such that a force exerted normal to any point on said cutting edge intersects said base portion, the projection of said cutting edge on said base portion being of a length less than that of said base portion, said cutting edge commencing at the leading end of said base portion and terminating in radially outwardly and forwardly spaced relation to the trailing end of said base portion, said body portion presenting a trailing edge inclined from the trailing end of said cutting edge inwardly and rearwardly to the trailing end of said base portion, said cutting edge generally paralleling one side edge of said base portion whereby the opposite side edge of said base portion extends rearwardly and laterally away from said cutting edge, said body portion presenting an inclined material impelling side wall surface extending between said opposite side edge of said base portion and said cutting edge diagonally related to said cutting edge and to the plane of rotation of the respective blade, said base portion having a rearwardly open notch therein at the juncture of the trailing edge of said body portion and the trailing end of said base portion, at least one attaching lug extending generally radially inwardly from said base portion adjacent the leading end thereof, a plurality of attaching lugs extending generally radially inwardly from said base portion at the wider portions thereof adjacent the trailing end thereof, said attaching lugs each having a slot therein transversely of the respective blade, said wheel hub having apertures therein through which each of the attaching lugs on each of said blades extend, said hub including a shear lug secured thereto adjacent the trailing end of each of said blades, said shear lugs being positioned in said notch in the respective blade, and a wedge member insertable in the slot in each of the attaching lugs of each of said blades transversely of the respective blade, said wedge members each wedgedly engaging the respective attaching lug and the inner surface of said hub, said wedge members of each blade being less strong in shear than the respective shear lug whereby when a predetermined excessive resistance is met, said wedge members will shear and said blade will pivot about said shear lug, and shim means for adjusting each of said blades on said hub and for adjusting each of said wedge members in the respective attaching lug.

References Cited in the file of this patent

UNITED STATES PATENTS

| | | | |
|---|---|---|---|
| 5,229 | Anthony | Aug. 7, | 1847 |
| 607,418 | Bandeen | July 19, | 1898 |
| 779,442 | Richmond et al. | Jan. 10, | 1905 |
| 927,331 | Dagel | July 6, | 1909 |
| 1,195,397 | Reed | Aug. 22, | 1916 |
| 1,285,514 | Whidden | Nov. 19, | 1918 |
| 1,750,202 | Steeves | Mar. 11, | 1930 |
| 1,770,679 | Turner | July 15, | 1930 |
| 2,312,371 | Strandlund | Mar. 2, | 1943 |
| 2,545,173 | Shaw | Mar. 13, | 1951 |

FOREIGN PATENTS

| | | |
|---|---|---|
| 734 | Great Britain | 1901 |